(12) United States Patent
Ju et al.

(10) Patent No.: US 12,545,012 B2
(45) Date of Patent: Feb. 10, 2026

(54) MULTIPLE LAYER INTERLAYER HAVING IMPROVED ACOUSTIC PROPERTIES

(71) Applicant: SOLUTIA INC., St. Louis, MO (US)

(72) Inventors: Hengyi Ju, Longmeadow, MA (US); Keyuan Huang, Mountain View, CA (US)

(73) Assignee: Solutia Inc., St. Louis, MO (US)

(*) Notice: Subject to any disclaimer, the term of this patent is extended or adjusted under 35 U.S.C. 154(b) by 266 days.

(21) Appl. No.: 18/249,564

(22) PCT Filed: Oct. 27, 2021

(86) PCT No.: PCT/US2021/056753
§ 371 (c)(1),
(2) Date: Apr. 19, 2023

(87) PCT Pub. No.: WO2022/103578
PCT Pub. Date: May 19, 2022

(65) Prior Publication Data
US 2023/0382088 A1    Nov. 30, 2023

Related U.S. Application Data

(60) Provisional application No. 63/198,749, filed on Nov. 10, 2020.

(51) Int. Cl.
*B32B 15/04* (2006.01)
*B32B 17/06* (2006.01)
*B32B 17/10* (2006.01)

(52) U.S. Cl.
CPC .. *B32B 17/10788* (2013.01); *B32B 17/10761* (2013.01); *B32B 2307/102* (2013.01)

(58) Field of Classification Search
CPC .................... B32B 17/10036; B32B 17/10788
USPC ........................................................ 428/428
See application file for complete search history.

(56) References Cited

U.S. PATENT DOCUMENTS

| | | | |
|---|---|---|---|
| 2,282,026 A | 5/1942 | Bren et al. | |
| 2,282,057 A | 5/1942 | Hopkins et al. | |
| 5,190,826 A | 3/1993 | Asahina et al. | |
| 5,340,654 A | 8/1994 | Ueda et al. | |
| 5,728,472 A | 3/1998 | D'Errico | |
| 7,510,771 B2 | 3/2009 | Lu | |
| 2017/0259530 A1* | 9/2017 | Wade | B32B 7/12 |
| 2017/0259535 A1* | 9/2017 | Karagiannis | B32B 27/08 |
| 2017/0259536 A1* | 9/2017 | Wade | B32B 7/022 |

(Continued)

FOREIGN PATENT DOCUMENTS

| | | |
|---|---|---|
| EP | 2 803 648 A1 | 11/2014 |
| WO | WO 2017/156364 A2 | 9/2017 |

OTHER PUBLICATIONS

Americorp (Year: 2025).*

(Continued)

*Primary Examiner* — Lauren R Colgan
(74) *Attorney, Agent, or Firm* — Steven A. Owen

(57) ABSTRACT

Multilayered interlayers having improved acoustic properties comprising a stiff skin layer(s) and a soft core layer comprising EVA are disclosed. The multilayered interlayers comprise: a first polymer layer (skin layer); a second polymer layer (skin layer); and a third polymer layer (core layer) comprising ethylene vinyl acetate resin between the first polymer layer and the second polymer layer.

11 Claims, 7 Drawing Sheets

(56) References Cited

U.S. PATENT DOCUMENTS

2017/0259539 A1* 9/2017 Wade .......................... B32B 7/12
2017/0259540 A1* 9/2017 Wade ..................... B32B 27/306
2018/0104932 A1* 4/2018 Lu ...................... B32B 17/10761
2020/0238668 A1* 7/2020 Karagiannis ............ B32B 17/08

OTHER PUBLICATIONS

Evalayer (Year: 2025).*
Notification of Transmittal of the International Search Report and the Written Opinion of the International Searching Authority, or the Declaration date of mailing Feb. 4, 2022 received in International Application No. PCT/US2021/056753.
Wade et al, "Vinyl Acetal Polymers, Encyclopedia of Polymer Science and Technology", 2016, pp. 1-22.

* cited by examiner

MULTIPLE LAYER INTERLAYER HAVING IMPROVED ACOUSTIC PROPERTIES

CROSS-REFERENCE TO RELATED APPLICATION(S)

This application is a national stage filing under 35 USC § 371 of International Application Number PCT/US2021/056753, filed on, Oct. 27, 2021 which claims the benefit of the filing date to U.S. Provisional Application No. 63/198,749, filed on Nov. 10, 2020, the entire disclosures of which are incorporated by reference herein.

BACKGROUND OF THE INVENTION

Field of the Invention

This disclosure is related to the field of polymer interlayers for multiple layer glass panels and multiple layer glass panels having at least one polymer interlayer sheet. Specifically, this disclosure is related to the field of polymer interlayers comprising multiple thermoplastic layers which have improved acoustic properties.

Description of Related Art

Multiple layer panels are generally panels comprised of two sheets of a substrate (such as, but not limited to, glass, polyester, polyacrylate, or polycarbonate) with one or more polymer interlayers sandwiched therebetween. The laminated multiple layer glass panels are commonly utilized in architectural window applications and in the windows of motor vehicles and airplanes, and in photovoltaic solar panels. The first two applications are commonly referred to as laminated safety glass. The main function of the interlayer in the laminated safety glass is to absorb energy resulting from impact or force applied to the glass, to keep the layers of glass bonded even when the force is applied and the glass is broken, and to prevent the glass from breaking up into sharp pieces. Additionally, the interlayer may also give the glass a much higher sound insulation rating, reduce UV and/or IR light transmission, and enhance the aesthetic appeal of the associated window. In regard to the photovoltaic applications, the main function of the interlayer is to encapsulate the photovoltaic solar panels which are used to generate and supply electricity in commercial and residential applications.

In order to achieve the certain property and performance characteristics for the glass panel, it has become common practice to utilize multiple layer or multilayered interlayers. As used herein, the terms "multilayer" and "multiple layers" mean an interlayer having more than one layer, and multilayer and multiple layer may be used interchangeably. Multiple layer interlayers typically contain at least one soft layer and at least one stiff layer. Interlayers with one soft "core" layer sandwiched between two more rigid or stiff "skin" layers have been designed with sound insulation properties for the glass panel. Interlayers having the reverse configuration, that is, with one stiff layer sandwiched between two more soft layers have been found to improve the impact performance of the glass panel and can also be designed for sound insulation. Examples of multiple layer interlayers also include the interlayers with at least one "clear" or non-colored layer and at least one colored layer or at least one conventional layer, e.g., non-acoustic layer, and at least one acoustic layer (i.e., a layer have acoustic properties or the ability to provide sound insulation or reduce sound transmission, as further defined below). Other examples of multiple layer interlayers include interlayers with at least two layers with different colors for aesthetic appeal. The colored layer typically contains pigments or dyes or some combination of pigments and dyes.

The layers of the interlayer are generally produced by mixing a polymer resin such as poly(vinyl butyral) or ethylene vinyl acetate copolymer, optionally with one or more plasticizers, and melt processing the mix into a sheet by any applicable process or method known to one of skill in the art, including, but not limited to, extrusion. Multiple layer interlayers can be produced by processes such as co-extrusion or lamination wherein the layers are combined together to form a unitary structure. Other additional ingredients may optionally be added for various other purposes. After the interlayer sheet is formed, it is typically collected and rolled for transportation and storage and for later use in the multiple layer glass panel, as discussed below.

The following offers a simplified description of the manner in which multiple layer glass panels are generally produced in combination with the interlayers. First, at least one polymer interlayer sheet (single or multilayer) is placed between two substrates and any excess interlayer is trimmed from the edges, creating an assembly. It is not uncommon for multiple polymer interlayer sheets or a polymer interlayer sheet with multiple layers (or a combination of both) to be placed within the two substrates creating a multiple layer glass panel with multiple polymer interlayers. Then, air is removed from the assembly by an applicable process or method known to one of skill in the art; e.g., through nip rollers, vacuum bag or another deairing mechanism. Additionally, the interlayer is partially press-bonded to the substrates by any method known to one of ordinary skill in the art. In a last step, in order to form a final unitary structure, this preliminary bonding is rendered more permanent by a high temperature and pressure lamination process, or any other method known to one of ordinary skill in the art such as, but not limited to, autoclaving.

Multilayer interlayers such as a trilayer interlayer having a soft core layer and two stiffer skin layers are commercially available. The stiff skin layers provide handling, processing and mechanical strength of the interlayer; the soft core layer provides acoustic damping properties.

Acoustics or sound dampening quality is an important characteristic of laminated glass. At most frequencies, laminated glass exhibits better sound transmission loss than monolithic glass of the same surface density. At critical frequencies (2000 to 20000 kHz) where the coincidence effect dominates sound transmission, the existence of an embedded polymer interlayer elicits sound attenuation in the glass panel and ameliorates the sound transmission loss to a great extent. Acoustic interlayer products have been formulated and refined, and the acoustic performance is now close to optimum for those products as currently formulated. As vehicles become more sophisticated and there is more use of electronic devices, there is a need for improved acoustic damping or a reduction of sound, such as road noise, entering vehicles. For buildings and structures, there is also a desire to reduce the amount of sound transmitted through windows and doors. It would also be desirable to have even greater acoustic performance.

Accordingly, there is a need in the art for the development of a multilayered interlayer that has good optical, mechanical, and acoustic characteristics desirable in a multilayered interlayer. More specifically, there is a need in the art for the development of multilayered interlayers having at least one soft core layer that has improved acoustic properties while maintaining other desirable physical and optical properties.

SUMMARY OF THE INVENTION

Because of these and other problems in the art, described herein, among other things are multilayered interlayers comprising stiff skin layers and a soft core layer(s). In an embodiment, these multilayered interlayers comprise: a first polymer layer; a second polymer layer; a third polymer layer comprising an ethylene vinyl acetate copolymer having a vinyl acetate content of at least 70 weight percent, wherein the third polymer layer is between the first polymer layer and the second polymer layer.

In embodiments, a multilayer interlayer comprises a first polymer layer comprising a poly(vinyl acetal) resin and a plasticizer; a second polymer layer comprising a poly(vinyl acetal) resin and a plasticizer; a third polymer layer comprising an ethylene vinyl acetate copolymer having a vinyl acetate content of at least 70 weight percent, wherein the third polymer layer is between the first polymer layer and the second polymer layer.

In an embodiment, the multilayer interlayer comprises an ethylene vinyl acetate copolymer having a vinyl acetate content of at least 75, or at least 80, or at least 85, or at least 90, or at least 95 weight percent or more.

A multiple layer panel is also disclosed. The multiple layer panel comprises at least one rigid substrate, and a polymer interlayer as disclosed herein. The panel has improved acoustic properties.

A method of making a polymer interlayer is also disclosed, wherein the polymer interlayer comprises is as disclosed herein.

In certain embodiments, the rigid substrate (or substrates) is glass.

DESCRIPTION OF THE PREFERRED EMBODIMENT(S)

Figure 1:
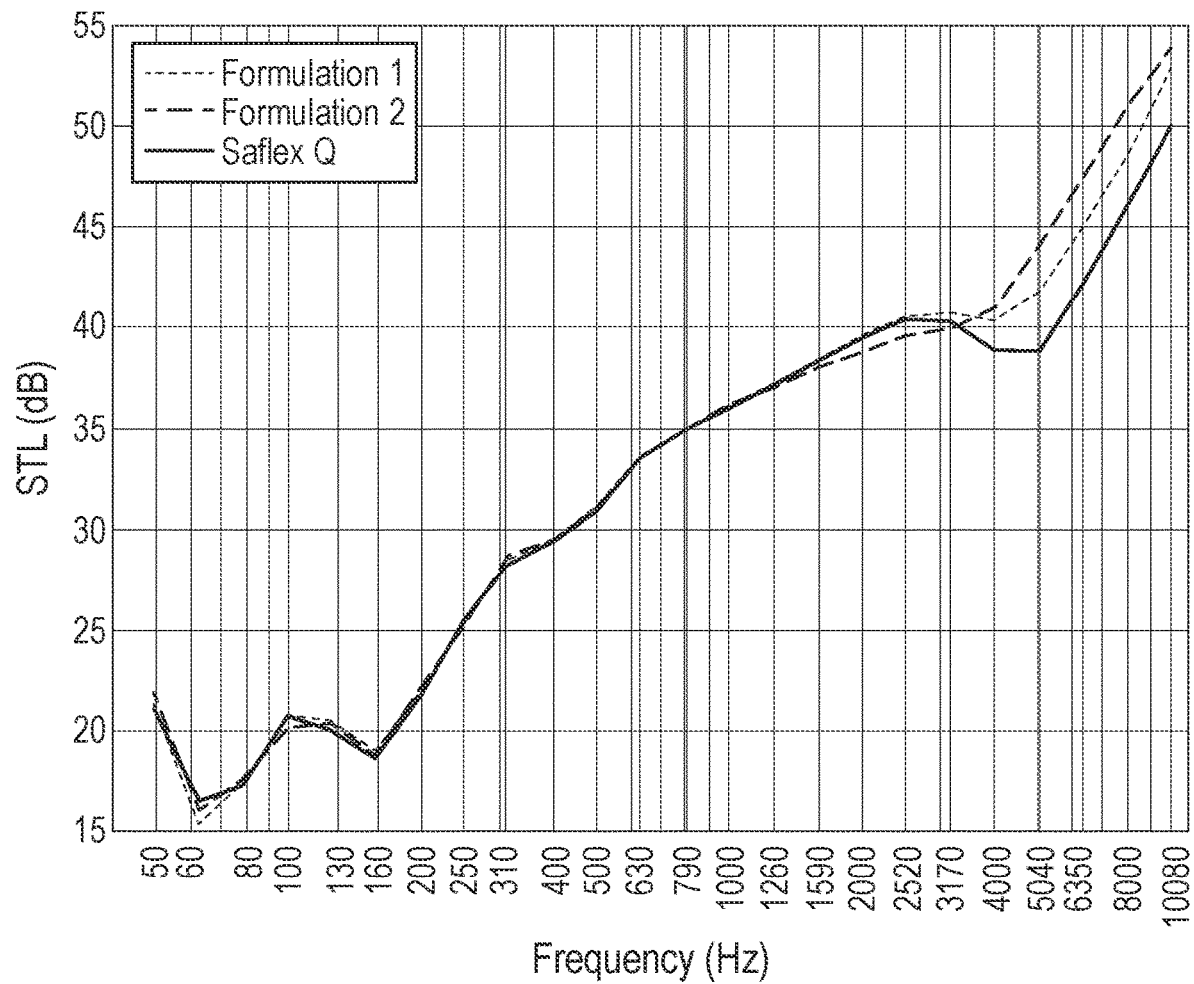
FIG. 1 is a graph showing the Sound Transmission Loss of disclosed interlayers of Examples A and B compared to a standard control acoustic PVB interlayers.

Described herein, among other things, are multilayer interlayers comprised of at least one soft core layer comprising an ethylene vinyl acetate copolymer resin and optionally a plasticizer, and at least one stiff skin layer comprising a resin and a plasticizer, wherein the multilayer interlayer has improved acoustic properties. The interlayers of present disclosure have improved acoustic or sound insulation properties as measured by sound transmission loss ("STL"). The interlayers of the present invention have an improved sound transmission loss (STL) (as measured by ASTM E90 (2009) at of at least about 40 decibels (dB) at 4000 Hertz (Hz) and damping loss factor (as measured by ISO16940 at 20° C.) of at least 0.2.

The present invention discloses multilayered interlayer wherein at least one layer comprises an ethylene vinyl acetate copolymer resin. These interlayers improved acoustic or sound insulation performance while having good optical and physical properties.

In embodiments, the interlayers, when measured in a 2.3 mm/2.3 mm glass configuration at 20° C. have a STL of at least about 39 dB at 2000 Hz, or at least about 41 dB at 4000 Hz, or at least about 47.5 dB at 6350 Hz, or at least about 54 dB at 10000 Hz.

In embodiments, the interlayers have a sound transmission loss (STL) (as measured by ASTM E90 (2009) at 20° C. in a 2.3 mm/2.3 mm glass configuration) of at least about 40, 40.5, 41, 41.5, or at least about 42 decibels (dB) at 4000 Hertz (Hz) and a damping loss factor of at least 0.2, 0.25, 0.3, 0.35, 0.4, 0.45, or at least about 0.5) (as measured by ISO16940 at 20° C. in a 2.3 mm/2.3 mm glass configuration).

In embodiments, the multilayer interlayer has a sound transmission loss (STL) (as measured by ASTM E90 (2009) at 20° C. in a 2.3 mm/2.3 mm glass configuration) of at least about 39, 39.5, 40, 40.5, or at least about 41 dB at 2000 Hz.

In embodiments, the multilayer interlayer has a sound transmission loss (STL) (as measured by ASTM E90 (2009) at 20° C. in a 2.3 mm/2.3 mm glass configuration) of at least about 47.5, 48, 48.5, 49, 49.5, or at least about 50 dB at 6350 Hz.

In embodiments, the multilayer interlayer has a sound transmission loss (STL) (as measured by ASTM E90 (2009) at 20° C. in a 2.3 mm/2.3 mm glass configuration) of at least about 54, 54.5, 55, 55.5, or at least about 56 dB at 10000 Hz.

In embodiments, the third polymer layer comprises an adhesion modifier in an amount of at least 0.1, 0.2, 0.3, 0.4, 0.5, 0.6, 0.7, 0.8, 0.9, 1.0, 2.0, 3.0, 4.0, 5.0, 6.0, 7.0, 8.0, 9.0, or at least 10.0 weight percent.

Also described are multiple layer glass panels comprising the interlayers. The multilayer interlayers of the present invention can be used in multiple layer glass applications, such as safety glass in windshields, side windows, sunroofs, and roof and architectural windows.

In addition to the ethylene vinyl acetate ("EVA") copolymer resin layer, one (or more) layer of the multilayered polymer interlayer can be made by mixing one or more polymer resins such as poly(vinyl acetal) resin (such as poly(vinyl butyral) ("PVB")) and one or more plasticizers. The multilayer interlayer generally contains two or more layers and two or more resins of different compositions. For example, poly(vinyl acetal) resins, such as PVB resins, of different residual hydroxyl contents and/or residual acetate contents are suitable for at least one layer of the multilayered interlayer compositions, while ethylene vinyl acetate copolymer resins are used in at least one other layer, such as the softer or core layer. In multilayer comprising two layers, at least one of the two layers is a soft layer and the other layer is a stiff layer. As used herein, a "soft layer" or "softer layer" is the layer having a glass transition temperature less than about 20° C. As used herein, a "stiff layer" or "stiffer layer" generally refers to a layer that is stiffer or more rigid than another layer and that has a glass transition temperature that is generally at least two degrees C. (2° C.) higher than another layer (such as the softer layer).

In embodiments, depending on the thickness of the layer(s), the individual glass transition temperature (Tg) values and the differences between the Tg values of the layers will vary. For example, for a core layer comprising an ethylene vinyl acetate copolymer as described herein and having a thickness of about 5 mil, the layer may have a Tg of about 0° C. to be able to reach the desired or optimal STL level. For a thicker core layer comprising an ethylene vinyl acetate copolymer as described herein and having a thickness of about 30 mil, the layer may have a Tg of about 17° C. Other layers and thicknesses can be selected depending on the desired properties and application.

Multilayer interlayers comprising a layer comprising an ethylene vinyl acetate copolymer resin are in particular useful for laminated glass panels and impart certain properties and performance attributes not found in conventional sound reducing poly(vinyl acetal) interlayers. The layers, and the multilayer interlayers, of the present invention provide interlayers having improved acoustic properties such as sound insulation properties, comparable to those of the conventional multilayer interlayer comprising poly(vinyl acetal) resins.

Conventional multilayer interlayers such as a trilayer acoustic interlayer contain a soft core layer consisting of a single poly(vinyl butyral) ("PVB") resin having a low residual hydroxyl content and a high amount of a conventional plasticizer, and two stiff skin layers having significantly higher residual hydroxyl content (see, for example U.S. Pat. Nos. 5,340,654, 5,190,826, and 7,510,771). The residual hydroxyl content in the PVB core resin and the amount of the plasticizer are optimized such that the interlayer provides optimal sound insulation properties under ambient conditions for multiple layer glass panels such as windshields and windows installed in vehicles and buildings.

Multilayer acoustic interlayers such as a trilayer can now be designed and produced by selecting an ethylene vinyl acetate copolymer resin for use in the core layer. In these interlayers, plasticizer equilibrium between the core layer(s) and the skin layer(s) is maintained, and the core layer(s) and skin layer(s) can be combined to form multilayer interlayers by applicable processes such as co-extrusion or lamination. The resultant multilayer acoustic interlayer provides excellent sound insulation properties without sacrificing other favorable and desired characteristics of conventional multi-layered interlayers, for example, optical properties, and mechanical strength of the glass panels made with the multilayered acoustic interlayer.

Some terminology as well as common components found in an interlayer, both generally and in interlayers of the present disclosure, and the formation thereof, will be discussed. The terms "polymer interlayer sheet," "interlayer," and "polymer melt sheet" as used herein, generally may designate a single-layer sheet or a multilayered interlayer. A "single-layer sheet," as the name implies, is a single polymer layer extruded as one layer. A multilayered interlayer, on the other hand, may comprise multiple layers, including separately extruded layers, co-extruded layers, or any combination of separately and co-extruded layers. Thus the multi-layered interlayer could comprise, for example: two or more single-layer sheets combined together ("plural-layer sheet"); two or more layers co-extruded together ("co-extruded sheet"); two or more co-extruded sheets combined together; a combination of at least one single-layer sheet and at least one co-extruded sheet; a combination of a single-layer sheet and a plural-layer sheet; and a combination of at least one plural-layer sheet and at least one co-extruded sheet. In various embodiments of the present disclosure, a multilayered interlayer comprises at least two polymer layers (e.g., a single layer or multiple layers co-extruded and/or laminated together) disposed in direct contact with each other, wherein each layer comprises a polymer resin, as detailed more fully below. As used herein for multilayer interlayers having at least three layers, "skin layer" generally refers to the outer layers of the interlayer and "core layer" generally refers to the inner layer(s). Thus, one exemplary embodiment would be: skin layer//core layer//skin layer. In the multilayer interlayers having skin layer//core layer//skin layer configuration, in some embodiments the skin layer maybe stiffer and the core layer may be softer, while in other embodiments the skin layer may be softer and the core layer may be stiffer.

As used herein, "Sound Transmission Loss" is determined for a laminate containing the interlayer of the present invention or comparative interlayer in accordance with ASTM E90 (2009) method at a fixed temperature of 20° C. The multilayer interlayers of the present invention are laminated with 2.3 mm clear glass. The panel has dimensions of 50 cm by 80 cm.

As used herein, "sound transmission loss (STL) (as measured by ASTM E90 (2009) at 20° C.)" of the interlayer or "sound transmission loss (STL) of the interlayer" refers to the STL at the reference frequency in a specified glass configuration. In various embodiments, the interlayers of the present invention have improved sound transmission loss (STL).

The glass transition temperature ($T_g$) can be determined by dynamical mechanical thermal analysis (DMTA) in shear mode. The DMTA measures the storage (elastic) modulus (G') in Pascals, loss (viscous) modulus (G") in Pascals, tan delta (=G"/G') of the specimen as a function of temperature at a given frequency, and temperature sweep rate. A frequency of 1 Hz and temperature sweep rate of 3° C./min were used herein. The $T_g$ is then determined by the position of the tan delta peak on the temperature scale in ° C. and the tan delta peak value is referred as tan delta or peak tan delta. As used herein, "tan delta", "peak tan delta", "tan δ" and "peak tan δ" may be used interchangeably.

At least one layer, such as the core layer, can comprise, consist essentially of, or consist of an ethylene vinyl acetate ("EVA") copolymer resin (also sometimes referred to as poly(ethylene-co-vinyl acetate) resin). In such embodiments, this layer may also be referred to as an "EVA layer." EVA copolymer resins are commercially available from a number of suppliers, for example, as Levamelt® and Levapren® from ARLANXEO Performance Elastomers, which is available in different grades and amounts of vinyl acetate.

The EVA layer may contain plasticizer. For example, the EVA layer may comprise less than 30, less than 25, less than 20, less than 15, less than 10, less than 5, less than 2, or less than 1 phr of added plasticizer. The plasticizer may be any plasticizer that is compatible with the EVA copolymer. Examples of suitable plasticizers are described below. In embodiments, the plasticizer used with the EVA is the same plasticizer as used in other layers, such as PVB layers. In certain embodiments, the EVA layer does not contain any added plasticizers.

EVA having different levels of vinyl acetate co-monomer can be used, depending on the desired properties. In certain embodiments, the EVA comprises a vinyl acetate content of at least 70, at least 80, or at least 90 and/or not more than 99, not more than 98, or not more than 95 weight percent, although different amounts may be used depending on the desired application and properties.

In various embodiments, the EVA comprises a formulated EVA, which in embodiments, contains a silane additive, a peroxide additive, a co-activator, a UV blocker, and an antioxidant. Alternatively, the EVA can comprise an "unformulated" EVA, which is missing one of the above listed components contained in the formulated EVA, such as a peroxide additive (in which case the EVA would no longer be thermally reactive). In various embodiments, the EVA can be maleated. In embodiments, the core layer may comprise a blend of one or more EVA resins.

The EVA layers can be used in conjunction with the other layers described herein to produce various types of multilayer interlayers, which can include other types of layers including poly(vinyl acetal) layers, such as polyvinyl butyral ("PVB") layers. An exemplary multilayer interlayer configuration includes: PVB/EVA/PVB (e.g., skin/core/skin).

Multilayer interlayers containing an EVA layer and one or more additional layers can be produced using any method known in the art. For example, each layer may be formed separately using techniques known in the art and then laminated together. Alternatively, multilayer interlayers containing an EVA layer and one or more additional layer, such as PVB, may be produced via co-extrusion.

Due to the crosslinking properties of EVA, it is generally desirable to avoid fully crosslinking the EVA when forming the EVA layer. Typically, partially crosslinked EVA is still able to be co-extruded with other polymers to form the multilayer interlayers. Thus, in some embodiments, it can be desirable to utilize extrusion temperatures that do not fully crosslink the EVA during extrusion. If amorphous EVA is fully crosslinked, its loss tangent in the glass transition region will be reduced, and this results in a negative effect on or reduction of the STL value.

In other embodiments, a lightly-crosslinked EVA without insoluble gels may be desirable to help improve creep and iceflower resistance of the core layer. In embodiments, the EVA core layer may contain peroxide and a co-activator for creating a lightly crosslinked network. In embodiments, the EVA may be modified with peroxide and the co-activator which would allow for the completion of the chemical reaction inside extruder, therefore eliminating the need to limit the extrusion temperature.

In embodiments, an adhesion modifier may be used to increase the adhesion level between the EVA layer and other polymer layer(s), such as PVB layers. The adhesion modifier may be incorporated into the EVA, or it may be coated onto the EVA layer. Examples of suitable adhesion modifiers include crotonic acid and peroxides, although other materials known to one skilled in the art may be used.

In embodiments having a layer(s) having at least one poly(vinyl acetal) resin, the poly(vinyl acetal) resin is produced by known acetalization processes by reacting polyvinyl alcohol ("PVOH") with one or more aldehydes such as butyraldehyde in the presence of an acid catalyst, separation, stabilization, and drying of the resin. Such acetalization processes are disclosed, for example, in U.S. Pat. Nos. 2,282,057 and 2,282,026 and Wade, B. 2016, Vinyl Acetal Polymers, Encyclopedia of Polymer Science and Technology. 1-22 (online, copyright 2016 John Wiley & Sons, Inc.), the entire disclosures of which are incorporated herein by reference. The resin is commercially available in various forms, for example, as Butvar® Resin from Solutia Inc., a wholly owned subsidiary of Eastman Chemical Company.

As used herein, residual hydroxyl content (calculated as % vinyl alcohol or % PVOH by weight) in poly(vinyl acetal) resin refers to the amount of hydroxyl groups remaining on the polymer chains after processing is complete. For example, PVB can be manufactured by hydrolyzing poly (vinyl acetate) to poly(vinyl alcohol) (PVOH), and then reacting the PVOH with butyraldehyde. In the process of hydrolyzing the poly(vinyl acetate), typically not all of the acetate side groups are converted to hydroxyl groups. Further, reaction with butyraldehyde typically will not result in all hydroxyl groups being converted to acetal groups. Consequently, in any finished PVB resin, there typically will be residual acetate groups (as vinyl acetate groups) and residual hydroxyl groups (as vinyl hydroxyl groups) as side groups on the polymer chain. As used herein, residual acetate content (calculated as % vinyl acetate content or poly(vinyl acetate) (PVAc) by weight in poly(vinyl acetal) refers to the amount of residual groups remaining on the polymer chains. As used herein, residual hydroxyl content and residual acetate content is measured on a weight percent (wt. %) basis per ASTM D1396.

According to the present invention, multilayer interlayers comprise at least a first layer comprising an ethylene vinyl acetate copolymer resin and a second layer comprising a poly(vinyl acetal) resin. In various embodiments, the first layer can be the soft layer and the second layer can be the stiff layer. In embodiments, when multilayer interlayer of the present invention is a trilayer, the core layer is the soft layer and the skin layers are the stiff layers.

In various embodiments, where the interlayer is a multilayer interlayer such as a trilayer, the soft (or core) layer comprises EVA copolymer resin as described above, and the outer, stiffer (or skin) layers comprise poly(vinyl acetal) resin. In embodiments, the poly(vinyl acetal) resin has a residual hydroxyl content of at least about 10 to about 35 wt. %, about 15 to about wt. %, or about 17 to about 22 wt. % residual hydroxyl groups calculated as % PVOH. In embodiments, the poly(vinyl acetal) resin has a residual hydroxyl content of at least about 10, at least about 12, at least about 14, at least about 15, at least about 16, at least about 17, at least about 18, at least about 19, at least about 20, at least about 21, or at least about 22 wt. % and less than about less than about 30, less than about 25, less than about 23, less than about 232 less than about 21, less than about 20, less than about 19, wt. % residual hydroxyl groups calculated as % PVOH.

In embodiments, the skin layers may comprise a blend of two or more poly(vinyl acetal) resins having different residual hydroxyl contents. This difference between the poly(vinyl acetal) resins is calculated by subtracting the residual hydroxyl content of the resin with the lower residual hydroxyl content from the residual hydroxyl content of the resin with the greater residual hydroxyl content. As used herein, the term "weight percent different" or "the difference . . . is at least . . . weight percent" refers to a difference between two given weight percentages, calculated by subtracting the one number from the other. For example, a poly(vinyl acetal) resin having a residual hydroxyl content of 12 weight percent has a residual hydroxyl content that is 2 weight percent lower than a poly(vinyl acetal) resin having a residual hydroxyl content of 14 weight percent (14 weight percent−12 weight percent=2 weight percent). As used herein, the term "different" can refer to a value that is higher than or lower than another value. One or more other poly (vinyl acetal) layers may also be present in the interlayer and can have a residual hydroxyl within the ranges provided above.

In various embodiments, the poly(vinyl acetal) resin can also comprise less than 30 wt. % residual acetate groups, less than 25 wt. % residual acetate groups, less than 20 wt. %, less than 15 wt. %, less than 13 wt. %, less than wt. %, less than 7 wt. %, less than 5 wt. %, or less than 1 wt. % residual acetate groups calculated as poly(vinyl acetate), with the balance being an acetal, such as butyraldehyde (which includes isobutyraldehyde acetal groups), but optionally another acetal group, such as a 2-ethyl hexanal acetal group, or a mix of butyraldehyde acetal and 2-ethyl hexanal acetal groups, as previously discussed.

In some embodiments where there is more than one poly(vinyl acetal) resin in a layer, the poly(vinyl acetal) resins can have different residual acetate contents. For example, in some embodiments, the difference between the residual acetate content of the first and second poly(vinyl acetal) resins can be at least about 2, at least about 3, at least about 4, at least about 5, at least about 6, at least about 7, at least about 8, at least about 9, at least about 10, at least about 12, at least about 14, at least about 16, at least about 18, at least about 20, at least about 24, or at least 29 weight percent. The poly(vinyl acetal) resin may have a residual acetate content of not more than about 4, not more than about 3, not more than about 2, or not more than about 1 weight percent, measured as described above. In some embodiments, the poly(vinyl acetal) resin can have a residual acetate content of at least 4, at least about 5, at least about 6, at least about 7, about 8, at least about 10, at least about 12, at least about 14, at least about 16, at least about 18, at least about 20, at least about or at least about 30 weight percent.

The poly(vinyl acetal) resin such as poly(vinyl butyral) (PVB) resin (or resins) of the present disclosure typically has a molecular weight of greater than 50,000 Daltons, or less than 500,000 Daltons, or about 50,000 to about 500,000 Daltons, or about 70,000 to about 500,000 Daltons, or about 100,000 to about 425,000 Daltons, as measured by size exclusion chromatography using a low angle laser light scattering detector, a differential refractometer or a UV detector. As used herein, the term "molecular weight" means the weight average molecular weight.

Various adhesion control agents ("ACAs") can be used in the interlayers of the present disclosure to control the adhesion of the interlayer sheet to glass. In various embodiments of interlayers of the present disclosure, the interlayer can comprise about 0.003 to about 0.15 parts ACAs per 100 parts resin; about 0.01 to about 0.10 parts ACAs per 100 parts resin; and about 0.01 to about 0.04 parts ACAs per 100 parts resin. Such ACAs, include, but are not limited to, the ACAs disclosed in U.S. Pat. No. 5,728,472 (the entire disclosure of which is incorporated herein by reference), sodium acetate, potassium acetate, magnesium bis(2-ethyl butyrate), and/or magnesium bis(2-ethylhexanoate).

Other additives may be incorporated into the interlayer to enhance its performance in a final product and impart certain additional properties to the interlayer. Such additives include, but are not limited to, dyes, pigments, stabilizers (e.g., ultraviolet stabilizers), antioxidants, anti-blocking agents, flame retardants, IR absorbers or blockers (e.g., indium tin oxide, antimony tin oxide, lanthanum hexaboride ($LaB_6$) and cesium tungsten oxide), processing aides, flow enhancing additives, lubricants, impact modifiers, nucleating agents, thermal stabilizers, UV absorbers, dispersants, surfactants, chelating agents, coupling agents, adhesives, primers, reinforcement additives, and fillers, among other additives known to those of ordinary skill in the art.

One or more layers may also include at least one plasticizer. Depending on the specific composition of layer(s), the plasticizer may be present in an amount of at least about 0.5, at least about 1, at least about 2, at least about 3, at least about 4, at least about 5, at least about 10, at least about 15, at least about 20, at least about 25, at least about 30, at least about 35, at least about 40, at least about 45, at least about 50, at least about 55, at least about 60 parts per hundred parts of resin (phr) and/or not more than about 120, not more than about 110, not more than about 105, not more than about 100, not more than about 95, not more than about 90, not more than about 85, not more than about 75, not more than about 70, not more than about 65, not more than about 60, not more than about 55, not more than about 50, not more than about 45, or not more than about 40 phr, or in the range of from about 5 to about 120, about 10 to about 110, about 20 to about 90, or about 25 to about 75 phr.

As used herein, the term "parts per hundred parts of resin" or "phr" refers to the amount of plasticizer present as compared to one hundred parts of resin, on a weight basis. For example, if 30 grams of plasticizer were added to 100 grams of a resin, the plasticizer would be present in an amount of 30 phr. If the layer includes two or more resins, the weight of plasticizer is compared to the combined amount of all resins present to determine the parts per hundred resin. Further, when the plasticizer content of a layer is provided herein, it is provided with reference to the amount of plasticizer in the mix or melt that was used to produce the layer.

Examples of suitable plasticizers can include, but are not limited to, conventional plasticizers such as triethylene glycol di-(2-ethylhexanoate) ("3GEH"), triethylene glycol di-(2-ethylbutyrate), triethylene glycol diheptanoate, tetraethylene glycol diheptanoate, tetraethylene glycol di-(2-ethylhexanoate) ("4GEH"), di hexyl adipate, dioctyl adipate, hexyl cyclohexyladipate, diisononyl adipate, heptylnonyl adipate, di(butoxyethyl) adipate, and bis(2-(2-butoxyethoxy)ethyl) adipate, dibutyl sebacate, dioctyl sebacate, and mixtures thereof. The plasticizer may be selected from the group consisting of triethylene glycol di-(2-ethylhexanoate) and tetraethylene glycol di-(2-ethylhexanoate), or the plasticizer can comprise triethylene glycol di-(2-ethylhexanoate). As used herein, plasticizer having a refractive index of about 1.450 or less is referred to as a "conventional plasticizer". These plasticizers have refractive indices of about 1.442 to about 1.449. In comparison, PVB resin has a refractive index of approximately 1.485 to 1.495. In interlayers manufactured for various properties and applications, 3GEH (refractive index=1.442) is one of the most common plasticizers present. Other plasticizers, including those not listed herein, may also be used.

In some embodiments, the plasticizer included in one or more layers may be a high RI plasticizer. As used herein, the term "high RI plasticizer" means a plasticizer having a refractive index of at least 1.460, measured by ASTM D542 at a wavelength of 589 nm and a temperature of 25° C. When used, the high RI plasticizer can have a refractive index of at least about 1.470, at least about 1.480, at least about 1.490, at least about 1.500, at least about 1.510, at least about 1.520 and/or not more than about 1.600, not more than about 1.575, or not more than about 1.550, measured as discussed above.

Examples of types or classes of high RI plasticizers can include, but are not limited to, polyadipates (RI of about 1.460 to about 1.485); epoxides such as epoxidized soybean oils (RI of about 1.460 to about 1.480); phthalates and terephthalates (RI of about 1.480 to about 1.540); benzoates and toluates (RI of about 1.480 to about 1.550); and other specialty plasticizers (RI of about 1.490 to about 1.520). Specific examples of suitable RI plasticizers can include, but are not limited to, dipropylene glycol dibenzoate, tripropylene glycol dibenzoate, polypropylene glycol dibenzoate, isodecyl benzoate, 2-ethylhexyl benzoate, diethylene glycol benzoate, butoxyethyl benzoate, butoxyethyoxyethyl benzoate, butoxyethoxyethoxyethyl benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), di-(butoxyethyl) terephthalate, di-(butoxyethyoxyethyl) terephthalate, and mixtures thereof. The high RI plasticizer may be selected from dipropylene glycol dibenzoate and tripropylene glycol dibenzoate, and/or 2,2,4-trimethyl-1,3-pentanediol dibenzoate.

When the resin layer or interlayer includes a high RI plasticizer, the plasticizer can be present in the layer alone or it can be blended with one or more additional plasticizers. The other plasticizer or plasticizers may also comprise high RI plasticizers, or one or more may be a lower RI plasticizer having a refractive index of less than 1.460. In some embodiments, the lower RI plasticizer may have a refractive index of less than about 1.450, less than about 1.445, or less than about 1.442 and can be selected from the group listed previously. When a mixture of two or more plasticizers are employed, the mixture can have a refractive index within one or more of the above ranges.

In some embodiments, the interlayer may include at least a first resin layer comprising a first resin and a first plasticizer and a second resin layer comprising a second resin and a second plasticizer. The first and second plasticizer can be the same type of plasticizer, or the first and second plasticizers may be different. In some embodiments, at least one of the first and second plasticizers may also be a blend of two or more plasticizers, which can be the same as or different than one or more other plasticizers.

In various embodiments, the high refractive index plasticizer(s) is selected such that the refractive index of the plasticizer is at least about 1.460, or greater than about 1.460, or greater than about 1.470, or greater than about 1.480, or greater than about 1.490, or greater than about 1.500, or greater than 1.510, or greater than 1.520, for both the core and/or skin layers. As used herein, a "high refractive index plasticizer" is a plasticizer having a refractive index of at least about 1.460. In some embodiments, the high refractive index plasticizer(s) is used in conjunction with a conventional plasticizer, and in some embodiments, if included, the conventional plasticizer is triethylene glycol di-(2-ethylhexanoate) ("3GEH"), and the refractive index of the plasticizer mixture is at least 1.460. As used herein, the refractive index of a plasticizer or a resin used in the entirety of this disclosure is either measured in accordance with ASTM D542 at a wavelength of 589 nm and 25° C. or as reported in literature in accordance with the ASTM D542.

Examples of plasticizers having a high refractive index that may be used include, but are not limited to, polyadipates (RI of about 1.460 to about 1.485); epoxides (RI of about 1.460 to about 1.480); phthalates and terephthalates (RI of about 1.480 to about 1.540); benzoates (RI of about 1.480 to about 1.550); and other specialty plasticizers (RI of about 1.490 to about 1.520). Specific examples of suitable high refractive index plasticizers include, but are not limited to, dipropylene glycol dibenzoate, tripropylene glycol dibenzoate, polypropylene glycol dibenzoate, isodecyl benzoate, 2-ethylhexyl benzoate, diethylene glycol benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, bis-phenol A bis(2-ethylhexaonate), ethoxylated nonylphenol, nonylphenyl tetraethylene glycol, dioctyl phthalate, diisononyl phthalate, di-2-ethylhexyl terephthalate, mixtures of benzoic acid esters of dipropylene glycol and diethylene glycol, and mixtures thereof.

The total plasticizer content in the interlayer can be from 0 to 120 phr, or greater than 0 phr, or greater than 5 phr, or greater than 10 phr, or greater than 15 phr, or greater than 20 phr, or greater than 25 phr, or greater than 30 phr and/or 120 phr or less, or 115 phr or less, or 110 phr or less, or 105 phr or less, or 100 phr or less, or 95 phr or less, or 90 phr or less, or 85 phr or less, or 80 phr or less, or 75 phr or less, or 70 phr or less, or within the range of 10 to 100 phr, or 20 to 80 phr, or 30 to 70 phr. In various embodiments, the interlayer or any layer of the interlayer comprises greater than 1, greater than 2, greater than 3, greater than 4, greater than 5 phr, about 5 to about 120 phr, about 10 to about 90 phr, about 20 to about 70 phr, about 30 to about 60 phr, or less than 120 phr, or less than 90 phr, or less than 60 phr, or less than 40 phr, or less than 30 phr total plasticizer. While the total plasticizer content is indicated above, the plasticizer content in the skin layer(s) or core layer(s) can be different from the total plasticizer content. In addition, the skin layer(s) and core layer(s) can have different plasticizer types and plasticizer contents, in the ranges previously discussed, as each respective layer's plasticizer content at the equilibrium state is determined by the layer's respective residual hydroxyl contents, as disclosed in U.S. Pat. No. 7,510,771 (the entire disclosure of which is incorporated herein by reference). For example, at equilibrium the interlayer could comprise two skin layers, each with 30 phr plasticizer, and a core layer with 65 phr plasticizer, for a total plasticizer amount for the interlayer of about 45.4 phr when the combined skin layer thickness equals that of the core layer. For thicker or thinner skin layers, the total plasticizer amount for the interlayer would change accordingly. As used herein, when the plasticizer content of the interlayer is given, the plasticizer content is determined with reference to the phr of the plasticizer in the mix or melt that was used to produce the interlayer.

The amount of plasticizer in the interlayer can be adjusted to affect the glass transition temperature ($T_g$) and the final acoustic performance of the interlayer. The glass transition temperature ($T_g$) is the temperature that marks the transition from the glassy state of the interlayer to the rubbery state. In general, higher amounts of plasticizer loading will result in lower $T_g$. Conventional, previously utilized layers or interlayers comprising poly(vinyl acetal) resins generally have had a $T_g$ in the range of about −10 to 25° C. for acoustic (noise reducing) interlayers, and up to about 45° C. for hurricane and aircraft (stiffer or structural) interlayer applications. For layers comprising EVA, the $T_g$ may be in a similar range, such as a range of about −10 to 20° C. for acoustic (noise reducing) interlayers, although other ranges may be desirable depending on the application.

An interlayer's glass transition temperature ($T_g$) is also correlated with the stiffness of the interlayer, and in general, the higher the glass transition temperature, the stiffer the interlayer. Generally, an interlayer with a glass transition temperature of 30° C. or higher increases windshield mechanical strength and torsional rigidity. A soft interlayer (generally characterized by an interlayer with a glass transition temperature of lower than 20° C.), on the other hand, contributes to the sound dampening effect (i.e., the acoustic characteristics). The interlayers of the present disclosure may have glass transition temperatures of about 26° C. or greater, or about 35° C. or greater for the stiffer layer(s), and about 20° C. or less, or 15° C. or less, or 10° C. or less, or about 5° C. or less, or 0° C. or less, or about −5° C. or less, or about −10° C. or less for the soft layer(s).

In some embodiments, the multilayered interlayers of the present disclosure combine these the advantageous properties of strength and acoustic by utilizing harder or stiffer skin layers laminated with a softer core layer comprising EVA (e.g., stiff//soft//stiff). In various embodiments, the multi-layered interlayers generally comprise stiffer layer(s) comprising poly(vinyl acetal) resin(s) with a glass transition temperature of about 26° C. to about 60° C., about 26° C. to 40° C., about 26° C. or greater, about 30° C. or greater, and about 35° C. or greater, and softer layer(s) of about 20° C. or less, about 10° C. or less, or about 5° C. or less, or about 0° C. or less, or about −5° C. or less, or about −10° C. or less.

The final interlayer, whether formed from extrusion or co-extrusion or by lamination of multiple layers, generally has a random rough surface topography as it is formed through melt fractures of polymer melt as it exits the extrusion die and may additionally be embossed over the random rough surface on one or both sides (e.g., the skin layers) by any method of embossment known to one of ordinary skill in the art.

While all methods for the production of polymer interlayer sheets known to one of ordinary skill in the art are contemplated as possible methods for producing the polymer interlayer sheets described herein, this application will focus on polymer interlayer sheets produced through the extrusion and co-extrusion processes. The final multiple layer glass panel laminate of the present invention is formed using lamination processes known in the art.

Generally, the thickness, or gauge, of the polymer interlayer sheet will be in a range from about 15 mils to 100 mils (about 0.38 mm to about 2.54 mm), about 15 mils to 60 mils (about 0.38 mm to about 1.52 mm), about 20 mils to about 50 mils (about 0.51 to 1.27 mm), and about 15 mils to about 35 mils (about 0.38 to about 0.89 mm). In various embodiments, each of the layers, such as the skin and core layers, of the multilayer interlayer may have a thickness of about 1 mil to 99 mils (about 0.025 to 2.51 mm), about 1 mil to 59 mils (about 0.025 to 1.50 mm), 1 mil to about 29 mils (about 0.025 to 0.74 mm), or about 2 mils to about 28 mils (about 0.05 to 0.71 mm).

Although many of the embodiments described below refer to the polymer resin for the outer layer(s) as being PVB and the core layer as EVA, it would be understood by one of ordinary skill in the art that the polymer may be any polymer suitable for use in a multiple layer panel. Typical polymers include, but are not limited to, polyvinyl acetals (PVA) (such as poly(vinyl butyral) (PVB) or poly(vinyl isobutyral), an isomer of poly(vinyl butyral) and also referred as PVisoB), aliphatic polyurethane (PU), polyvinylchloride (PVC), poly(vinylchloride-co-methacrylate), polyethylenes, polyolefins, ethylene acrylate ester copolymers, poly(ethylene-co-butyl acrylate), silicone elastomers, epoxy resins, and acid copolymers such as ethylene/carboxylic acid copolymers and its ionomers, derived from any of the foregoing possible thermoplastic resins, combinations of the foregoing, and the like. PVB and its isomer polyvinyl isobutyral, polyvinyl chloride, ionomers, and polyurethane are suitable polymers generally for the outer layer(s) of the multilayer interlayers, and PVB (including its isomer PVisoB) is particularly suitable.

While generally referred to as poly(vinyl acetal) or poly(vinyl butyral), any of the poly(vinyl acetal) resins can include residues of any suitable aldehyde, such as isobutyraldehyde, as previously discussed. In some embodiments, one or more poly(vinyl acetal) resin can include residues of at least one $C_1$ to $C_{10}$ aldehyde, or at least one $C_4$ to $C_8$ aldehyde. Examples of suitable $C_4$ to $C_8$ aldehydes can include, but are not limited to, n-butyraldehyde, isobutyraldehyde, 2-methylvaleraldehyde, n-hexyl aldehyde, 2-ethylhexyl aldehyde, n-octyl aldehyde, and combinations thereof. At least one of the first and second poly(vinyl acetal) resins can include at least about 20, at least about 30, at least about 40, at least about 50, at least about 60, or at least about 70 weight percent of residues of at least one $C_4$ to $C_8$ aldehyde, based on the total weight of aldehyde residues of the resin, and/or can include not more than about 90, not more than about 85, not more than about 80, not more than about 75, not more than about 70, or not more than about 65 weight percent of at least one $C_4$ to $C_8$ aldehyde, or in the range of from about 20 to about 90, about 30 to about 80, or about 40 to about 70 weight percent of at least one $C_4$ to $C_8$ aldehyde. The $C_4$ to $C_8$ aldehyde may be selected from the group listed above, or it can be selected from the group consisting of n-butyraldehyde, isobutyraldehyde, 2-ethylhexyl aldehyde, and combinations thereof.

In various embodiments, one or more poly(vinyl acetal) resin may be a poly(vinyl butyral) (PVB) resin. In other embodiments, one or more poly(vinyl acetal) resin can be a poly(vinyl butyral) resin that mainly comprises residues of n-butyraldehyde, and may, for example, include not more than about 50, not more than about 40, not more than about 30, not more than about 20, not more than about 10, not more than about 5, or not more than about 2 weight percent of residues of an aldehyde other than butyraldehyde, based on the total weight of all aldehyde residues of the resin.

As used herein, a multiple layer panel can comprise a single substrate, such as glass, acrylic, or polycarbonate with a polymer interlayer sheet disposed thereon, and most commonly, with a polymer film further disposed over the polymer interlayer. The combination of polymer interlayer sheet and polymer film is commonly referred to in the art as a bilayer. A typical multiple layer panel with a bilayer construct is: (glass)//(polymer interlayer sheet)//(polymer film), where the polymer interlayer sheet can comprise multiple interlayers, as noted above. The polymer film supplies a smooth, thin, rigid substrate that affords better optical character than that usually obtained with a polymer interlayer sheet alone and functions as a performance enhancing layer. Polymer films differ from polymer interlayer sheets, as used herein, in that polymer films do not themselves provide the necessary penetration resistance and glass retention properties, but rather provide performance improvements, such as infrared absorption characteristics. Poly(ethylene terephthalate) ("PET") is the most commonly used polymer film. Generally, as used herein, a polymer film is thinner than a polymer sheet, such as from about 0.001 to 0.2 mm thick.

The interlayers of the present disclosure will most commonly be utilized in multiple layer panels comprising two substrates, such as a pair of glass sheets (or other rigid materials, such as polycarbonate or acrylic, known in the art), with the interlayers disposed between the two substrates. An example of such a construct would be: (glass)//

(polymer interlayer sheet)//(glass), where the polymer interlayer sheet can comprise multilayered interlayers, as noted above, and wherein the core layer of the multilayer interlayer can comprise a single resin, or comprises a first resin and a second resin having higher residual hydroxyl content, and at least one high refractive index plasticizer such that a transparent multiple layer panel having excellent clarity, or high % $T_{vis}$ or minimal haze is created. These examples of multiple layer panels are in no way meant to be limiting, as one of ordinary skill in the art would readily recognize that numerous constructs other than those described above could be made with the interlayers of the present disclosure.

The typical glass lamination process comprises the following steps: (1) assembly of the two substrates (e.g., glass) and interlayer; (2) heating the assembly via an IR radiant or convective means for a short period; (3) passing the assembly into a pressure nip roll for the first deairing; (4) heating the assembly a second time (such as to about 60° C. to about 120° C.) to give the assembly enough temporary adhesion to seal the edge of the interlayer; (5) passing the assembly into a second pressure nip roll to further seal the edge of the interlayer and allow further handling; and (6) autoclaving the assembly at appropriate temperatures and pressures such as between 135° C. and 150° C. and pressures between 180 psig and 200 psig for an appropriate time, such as about 30 to 90 minutes. The actual steps, as well as the times and temperatures, may vary as necessary, as known by one skilled in the art.

Other means for use in de-airing of the interlayer-glass interfaces (steps 2-5) known in the art and that are commercially practiced include vacuum bag and vacuum ring processes in which a vacuum is utilized to remove the air.

The glass transition temperature ($T_g$) was determined by dynamical mechanical thermal analysis (DMTA). The DMTA measures the storage (elastic) modulus (G') in Pascals, loss (viscous) modulus (G") in Pascals, tan delta (=G"/G') of the specimen as a function of temperature at a given oscillation frequency, and temperature sweep rate. DMTA with an oscillation frequency of 1 Hz under shear mode and temperature sweep rate of 3° C./min were used herein to measure $T_g$. The $T_g$ is then determined by the position of the tan delta peak on the temperature scale in ° C.

"Sound transmission loss" (STL) is determined for a laminate of the present invention of fixed dimensions with ASTM E90 (2009) at a fixed temperature of 20° C. The multilayer interlayers of the present invention are laminated with 2.3 mm clear glass according to the method described above for making a laminated glass panel (having a configuration of 2.3 mm glass//interlayer//2.3 mm glass). The panel has dimensions of 50 cm by 80 cm. In various embodiments, the STL of the glass panel comprising the multilayer interlayer of the present invention is at least about 39 dB at 2000 Hz, or at least about 41 dB at 4000 Hz, or at least about 47.5 dB at 6350 Hz, or at least about 54 dB at 10000 Hz.

Haze may be measured using a haze meter or a spectrophotometer, such as HunterLab UltraScan XE instrument, or other haze meter known to one of skill in the art, and in accordance with ASTM D1003-Procedure B using Illuminant C, at an observer angle of 2 degrees. Percent transmittance (% T) or Transparency, is the percentage of the total incident light transmitted through the specimen, and is determined according to ASTM D1003 as well. In various embodiments of the present disclosure, haze is less than 5%, less than 4%, less than 3%, less than 2%, less than 1%, and less than 0.5%.

HLD haze is measured by a HLD haze measurement apparatus, which is constructed with a tungsten halogen light source, a sample holder, and a goniometer with a light detector mounted on it. The HLD haze measurement apparatus is calibrated using a set of HLD standard laminates having a total thickness of 8.3 mm (5 layers of 0.76 mm interlayer) between two 2.3-mm clear glass sheets representing HLD Haze grades 0, 1, 2, and the like, with increasing values indicating increased HLD haze. In this measurement, laminate was made with clear glass having thickness of about 2.3 mm by normal autoclave lamination process. After the autoclave, the laminate was placed at room temperature overnight. The scatted light intensity at a scatted angle of 45° is collected from a testing laminate sample at room temperature using the HLD haze measurement apparatus, and HLD haze is calculated using a computer software and reported at a nominal total laminate thickness.

In some embodiments, the resin blends, layers, and interlayers described herein may have an HLD value of less than 1, less than about 0.9, less than about 0.8, less than about 0.7, less than about 0.6, or less than about 0.5.

Pummel adhesion is another parameter that may be used to describe the interlayers disclosed herein. The Pummel Adhesion Test measures the adhesion level of glass to the interlayer in a laminate construction. The interlayer to glass adhesion has a large effect on the impact resistance and long-term stability of glass-interlayer structures. In this test, the laminates are either cooled to 0° F. (−18° C.) or conditioned at room temperature of 70° F. (21° C.) and manually pummeled with a 1 lb. (0.45 kg) hammer on a steel plate at a 45° angle. The samples are then allowed to come to room temperature and all broken glass unadhered to the interlayer is then removed. The amount of glass left adhered to the interlayer is visually compared with a set of standards. The standards correspond to a scale in which varying degrees of glass remained adhered to the interlayer. For example, at a pummel standard of zero, essentially no glass is left adhered to the interlayer. On the other hand, at a pummel standard of ten, essentially 100 percent of the glass remains adhered to the interlayer. Pummel values are grouped and averaged for like specimens. Reported values state the average pummel value for the group and the maximum range of the pummel adhesion rating for individual surfaces. The interlayers described herein may have a pummel adhesion rating of 2 or greater, or 9 or less, or from about 2 to about 9.

The values for mean break height provided herein are obtained using an interlayer having a known thickness (as indicated), such as 30 mils, 45 mils, or other thickness, laminated between two 2.3-mm thick sheets of glass. The specification of values for these parameters is not intended to, in any way, limit the thickness of the interlayers described herein or the configuration of multiple layer panels according to embodiments of the present invention. Rather, specification of values for these parameters is intended to provide a definite test for determining the impact resistance, measured as mean break height, exhibited by an interlayer, and the test is measured at a known thickness and if necessary, normalized to a constant thickness (such as 30 mils or 45 mils) so that different interlayers can be compared at the same interlayer thickness.

Interlayers of the present invention may be used to form panels that exhibit a mean break height similar to the mean break height of comparative interlayers.

EXAMPLES

The improvements in acoustic properties can be most readily appreciated by a comparison of multilayer (trilayer)

interlayers having a core layer comprising EVA to a multilayer interlayer having a core layer comprising PVB as shown in FIGS. 1 to 4. As shown in the FIGURES and discussed below, these Examples demonstrate that acoustic properties can be improved compared to conventional interlayers when using EVA in the core layer. For example, when using EVA in the core layer, in some cases there is an improvement of up to 3 dB at a frequency of 4000 Hz and higher without negatively impacting the STL at lower frequencies. In some cases, this improvement is at least a 4 dB increase in high frequencies (>4000 Hz) with only a slight tradeoff or decrease in the 2000 to 3000 Hz range. Other properties, such as Haze and Impact can be maintained.

Example 1

Exemplary multilayer interlayers were produced. For the PVB layers (skin our outer layers), 100 parts PVB resin having a residual hydroxyl content of about 18.7 wt. % was mixed with plasticizer (and common additives), and for the EVA layers, 100 parts EVA resin having a vinyl acetate content of 80 wt. % was mixed with plasticizer (and common additives), as shown in the Table 1. The PVB and EVA layers were co-extruded to form multilayered interlayers.

FIG. 1 is a graph showing the Sound Transmission Loss of disclosed interlayers of Table 1 compared to a standard control acoustic PVB interlayer (Saflex® Q series PVB). As shown in FIG. 1, the interlayers having a core comprising EVA have higher sound transmission loss values at frequencies of about 4000 Hz or more, that is, an increase of at least 2 dB in the 4000 Hz range and above, and only a small decrease of about 1 dB decrease in the 2000 Hz to 3000 Hz range.

TABLE 1

| Sheet No. | Skin Plasticizer Level (in premix, phr) | Core Thickness (mil) | Core Plasticizer Level (in premix, phr) | Total Thickness (mils) |
| --- | --- | --- | --- | --- |
| Formulation 1 | 19 | 5 | 0 | 32 |
| Formulation 2 | 15 | 5 | 0 | 32 |
| Control | 38 | 4.5 | 75 | 32 |

Additional skin and core layers were produced. The skin layers were produced using, 100 parts PVB resin having a residual hydroxyl content of about 18.7 wt. % and plasticizer in the amounts shown in Table 2. The core layers were produced with EVA resin having a vinyl acetate content of 80 wt. % at different skin thicknesses as shown in Table 2. No plasticizer was used in the EVA layers. The skin and core layers were combined (pressed together) to make a tri-layer interlayer having the PVB skin layers as outer layers and the EVA layer as the middle or core layer. The interlayers produced are shown in Table 2. Table 3 shows the expected levels of plasticizer in the skin and core layers as well as the expected Tg of the core layer, based on the plasticizer partition ratios established by measuring the respective plasticizer levels of the pressed together multilayer interlayers until no further changes were observed. The actual core layer plasticizer levels and Tg values were measured on several samples and are shown in Table 3 below.

TABLE 2

| Example No. | Skin Plasticizer Level (in premix, phr) | Core Thickness (mil) | Core Plasticizer Level (in premix, phr) | Total Thickness (mils) |
| --- | --- | --- | --- | --- |
| 1 | 31 | 8 | 0 | 32 |
| 2 | 31 | 5 | 0 | 32 |
| 3 | 31 | 3 | 0 | 32 |
| 4 | 27 | 8 | 0 | 32 |
| 5 | 27 | 5 | 0 | 32 |
| 6 | 27 | 2 | 0 | 32 |
| 7 | 23 | 8 | 0 | 32 |
| 8 | 23 | 5 | 0 | 32 |
| 9 | 23 | 2 | 0 | 32 |
| 10 | 19 | 8 | 0 | 32 |
| 11 | 19 | 5 | 0 | 32 |
| 12 | 19 | 2 | 0 | 32 |
| 13 | 15 | 7 | 0 | 32 |
| 14 | 15 | 5 | 0 | 32 |
| 15 | 15 | 3 | 0 | 32 |
| Control 1 & 2 | 38 | 4.5 | 75 | 32 |

TABLE 3

| Example No. | Expected Skin Plasticizer Level at Equilibrium (phr) | Expected Core Plasticizer Level at Equilibrium (phr) | Actual Core Plasticizer Level (phr) | Expected Core Tg at Equilibrium (° C.) | Actual Core Tg (° C.) |
| --- | --- | --- | --- | --- | --- |
| 1 | 23.0 | 24.2 | — | −12.9 | — |
| 2 | 26.0 | 27.3 | — | −15.3 | — |
| 3 | 28.0 | 29.4 | — | −16.9 | — |
| 4 | 20.0 | 21.0 | — | −10.2 | — |
| 5 | 22.6 | 23.8 | — | −12.5 | — |
| 6 | 25.3 | 26.5 | — | −14.7 | — |
| 7 | 17.1 | 17.9 | — | −7.3 | — |
| 8 | 19.3 | 20.0 | 20.0 | −9.5 | −9.4 |
| 9 | 21.5 | 22.6 | — | −11.5 | — |
| 10 | 14.1 | 14.8 | — | −4.2 | — |
| 11 | 16.0 | 16.8 | 17.0 | −6.5 | −6.7 |
| 12 | 17.8 | 18.7 | — | −8.0 | — |
| 13 | 11.8 | 12.2 | — | −1.4 | — |
| 14 | 12.5 | 13.1 | 12.0 | −2.7 | −1.3 |
| 15 | 13.5 | 14.2 | — | −3.6 | — |
| Control 1 & 2 | 38 | 75 | — | 0 | 0 to −2 |

Tables 2 and 3 show that interlayers can be produced with core layers comprising EVA that have desired low glass transition temperatures. Some of these interlayers were then tested for physical and optical properties.

Figure 2:
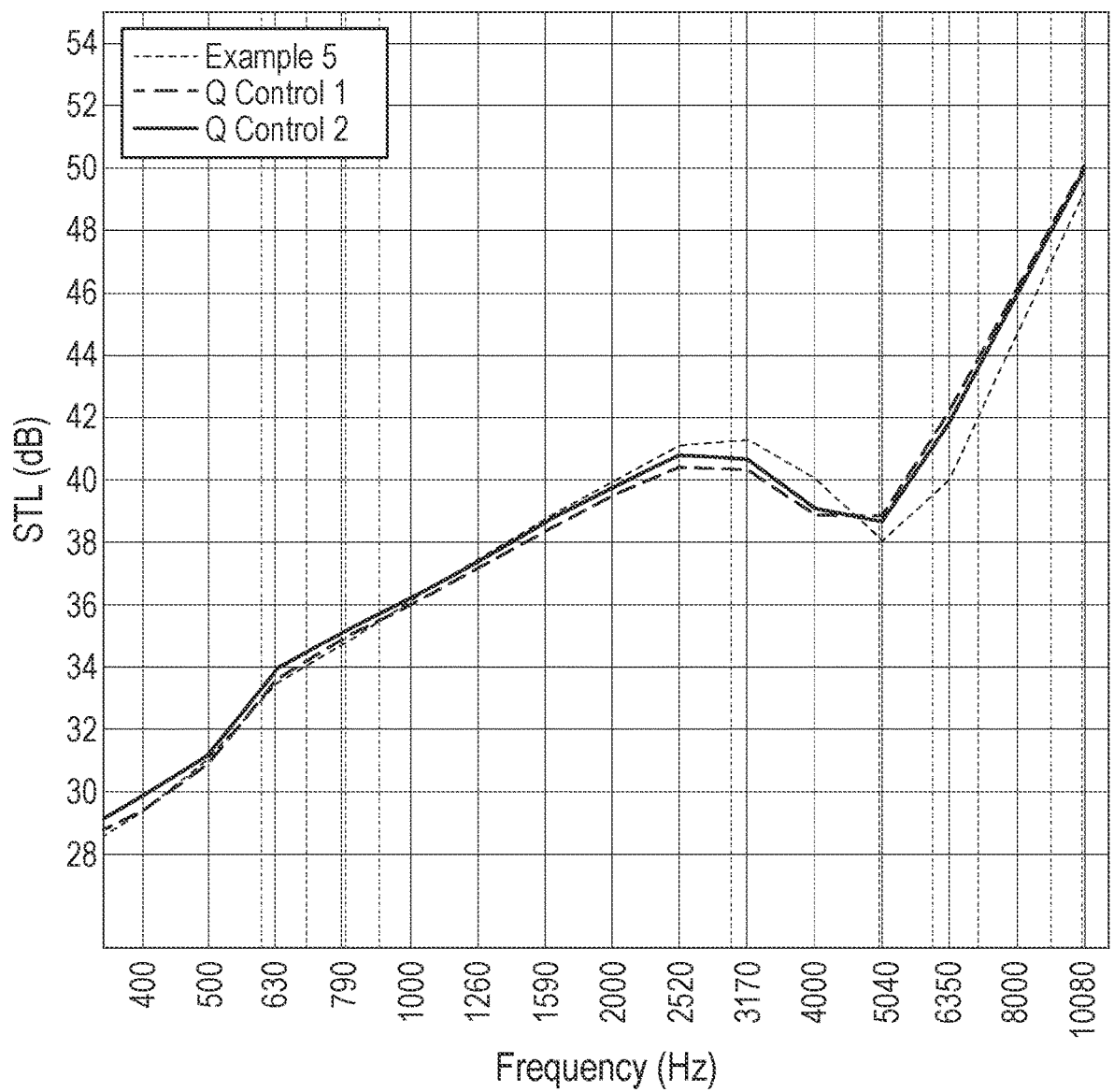
FIG. 2 is a graph showing the Sound Transmission Loss of the disclosed interlayer of Example 5 compared to two control acoustic PVB interlayers.

FIG. 2 is a graph showing the Sound Transmission Loss of the disclosed interlayer of Example 5 compared to two control acoustic PVB interlayers (Saflex® Q series PVB interlayers). FIG. 2 shows that it is possible to improve STL in the middle frequencies by using certain amounts of plasticizer and targeting a particular core Tg level. In other words, the STL trade-off between middle frequencies and high frequencies could be manipulated or controlled depending on the desired level or need at a particular frequency and application.

Figure 3:
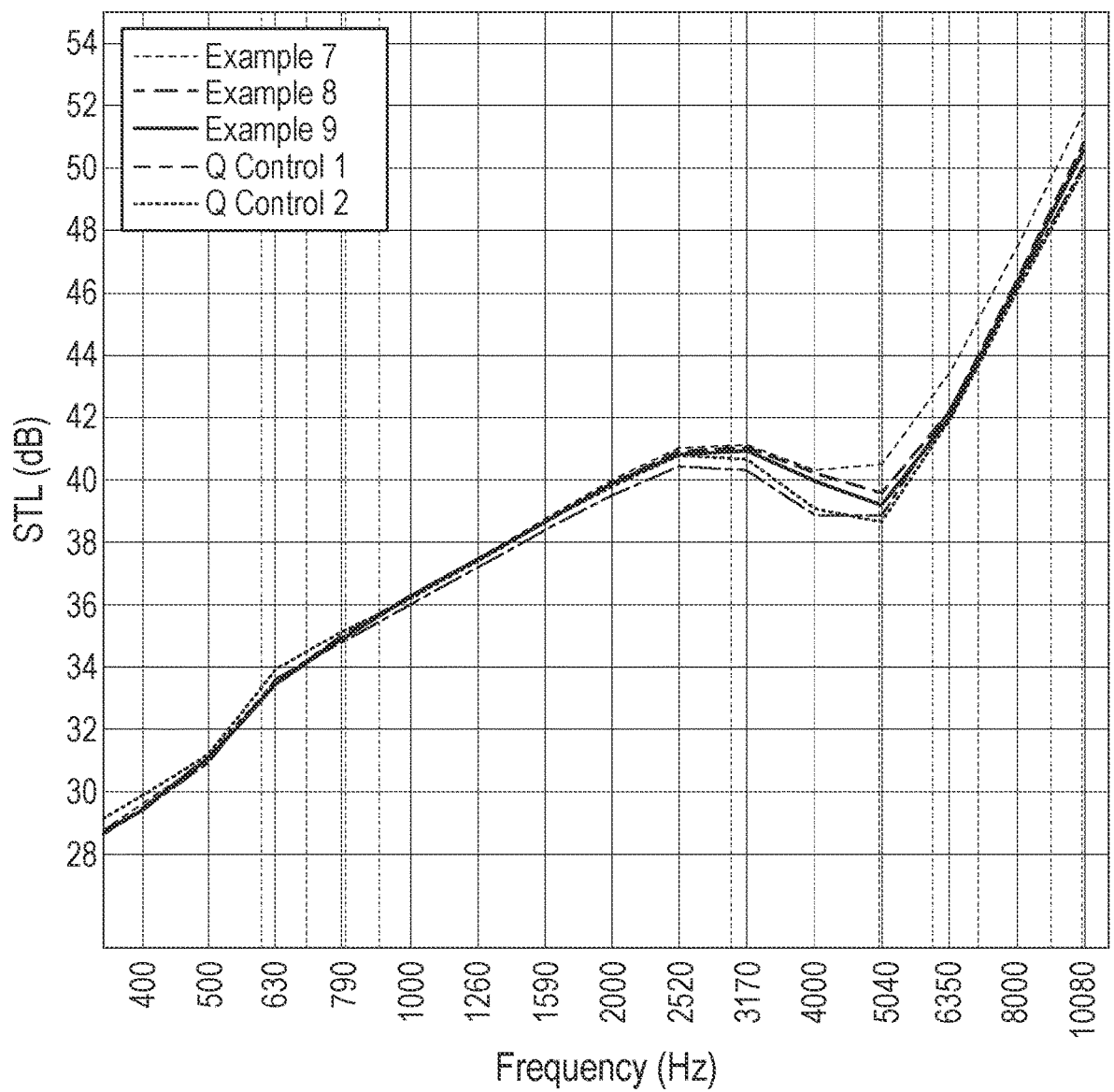
FIG. 3 is a graph showing the Sound Transmission Loss of the disclosed interlayers of Example 7, 8 and 9 compared to two control acoustic PVB interlayers.

FIG. 3 is a graph showing the Sound Transmission Loss of the disclosed interlayers of Examples 7, 8 and 9 compared to the same two control acoustic PVB interlayers (Saflex® Q series PVB interlayers). FIG. 3 shows that it is possible to tune the STL improvement in different frequency ranges.

Figure 4:
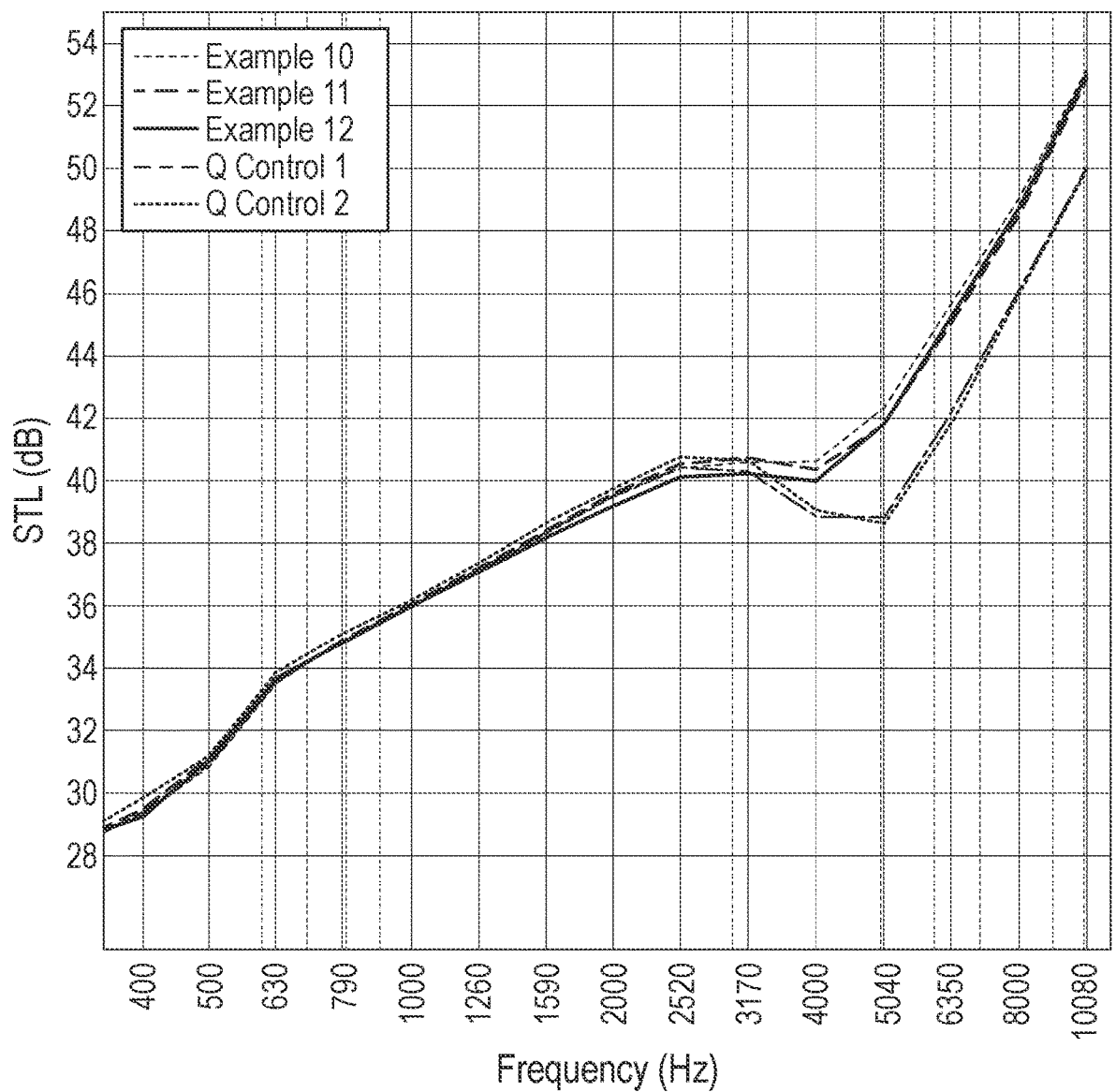
FIG. 4 is a graph showing the Sound Transmission Loss of the disclosed interlayers of Example 10, 11 and 12 compared to two control acoustic PVB interlayers.

FIG. 4 is a graph showing the Sound Transmission Loss of the disclosed interlayers of Examples 10, 11 and 12 compared to the same two control acoustic PVB interlayers (Saflex® Q series PVB interlayers). FIG. 4 shows that improvements of up to 3 dB the high frequency range can be achieved with only minimal STL loss in the 2000 to 3000 Hz range.

Several of the samples were tested for other physical and optical properties. Table 4 shows the impact results and mean break heights of 3 of the disclosed interlayers (Examples 8, 11 and 14) compared to commercially available structural interlayer (Saflex® Structural DG-41 interlayer) and a control acoustic interlayer (Saflex® Acoustic QF-51 interlayer). Table 5 shows the clear Haze (%) and HLD Haze (%) values of the same disclosed interlayers compared to a commercially available monolithic interlayer (Saflex® R series RB-41 interlayer).

TABLE 4

| Sheet No. | Skin Plasticizer Level (phr) | Core Plasticizer Level (phr) | Pummel (0° F.) | Mean Break Height (ft.) |
|---|---|---|---|---|
| 8 | 19.3 | 20 | 2 | 28.7 |
| 11 | 16.0 | 16.8 | 2 | 18.5 |
| 14 | 12.5 | 13.1 | 2 | 12.9 |
| DG-41 | 20 | N/A | Shattered | 15-20 |
| QF-51 | 38 | 75 | 2 | 22 |

TABLE 5

| Sheet No. | Skin Plasticizer Level (phr) | Core Plasticizer Level (phr) | Clear Haze (%) | HLD Haze (%) |
|---|---|---|---|---|
| 8 | 19.3 | 20 | 0.38 | 0.38 |
| 11 | 16.0 | 16.8 | 0.58 | 0.62 |
| 14 | 12.5 | 13.1 | 0.55 | 0.58 |
| RB-41 | 38 | N/A | 0.15 | 1 |

Table 4 shows that the disclosed interlayers have similar adhesion (pummel) values as commercially available acoustic tri-layer interlayers, which have similar skin layers but PVB core layers. Table 4 also shows that a mean break height similar to commercially available acoustic tri-layer interlayers can be achieved.

Table 5 shows that the disclosed interlayers have excellent clear haze and HLD haze values. It is believed that the Haze of the disclosed Examples is higher than that of the control (RB-41) sample due to the presence of an anti-blocking agent (about 0.2 wt. % silica and about 0.05 wt. % talc) in the ethylene vinyl acetate resin, which is added to ensure free flow properties of the EVA pellets, but it is still less than 1%. If the amount of anti-blocking agent is reduced, the Haze could be reduced.

Examples 10 to 15 show significant STL performance improvement over commercially available acoustic interlayers (such as Saflex® Q series Acoustic Interlayer used as the control samples 1 and 2) in the frequency range from 4000 to 10,000 Hz. The Tg of the core layer of Examples 10 to 15 is within the range of about −8° C. to 0° C.

Figure 5:
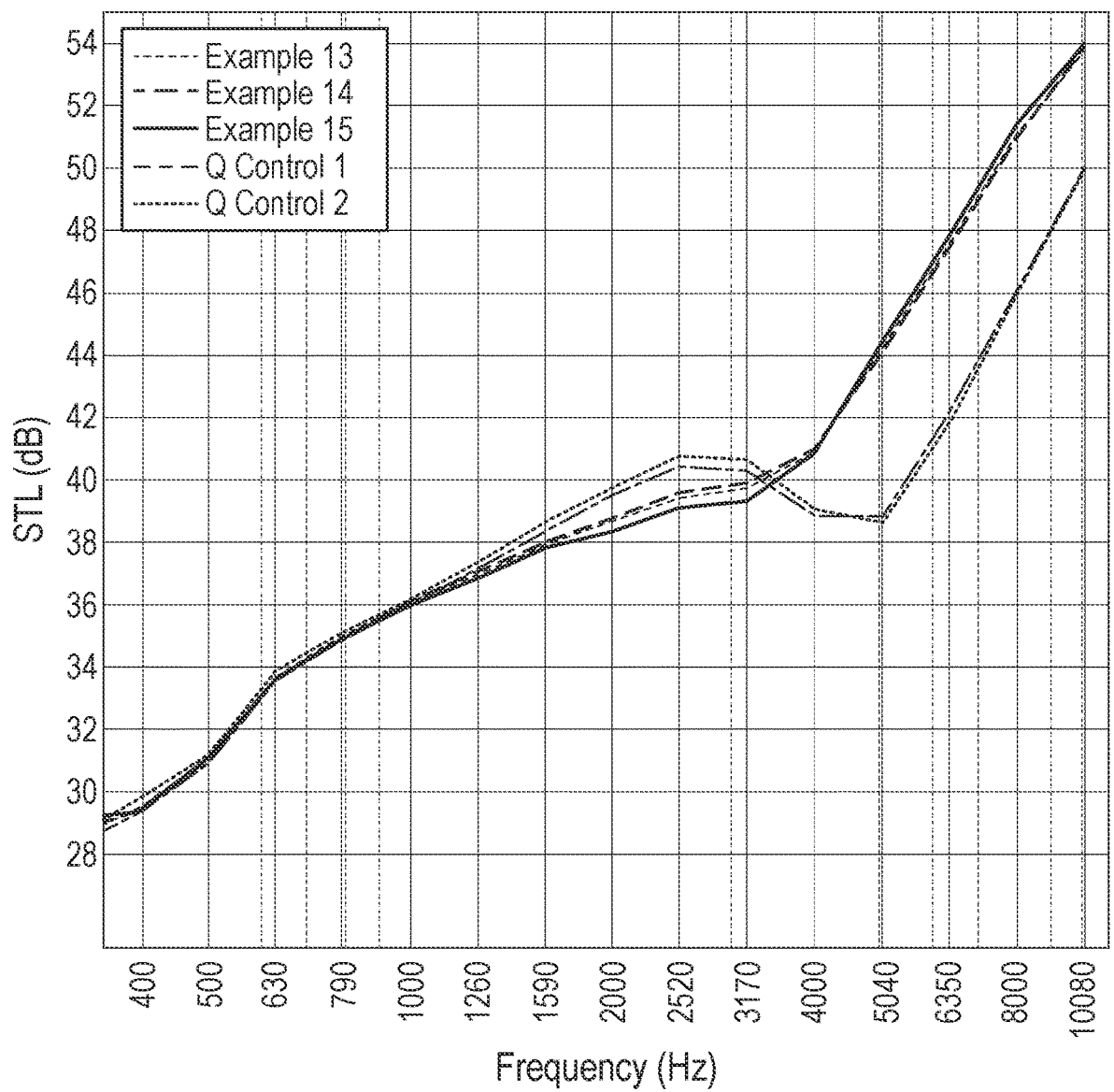
FIG. 5 is a graph showing the Sound Transmission Loss of the disclosed interlayers of Example 13, 14 and 15 compared to two control acoustic PVB interlayers.

FIG. 5 is a graph showing the Sound Transmission Loss of the disclosed interlayers of Example 13, 14 and 15 compared to two control acoustic PVB interlayers (Saflex® Q series PVB interlayers). FIG. 5 shows that it is possible to achieve 4 dB increases in the 4000 to 10000 Hz frequency range with only a small (up to about 1 dB) loss in 2000 to 3000 range. FIG. 5 shows that there is a significant increase of maximum loss tangent in samples having a core layer comprising EVA compared to samples having PVB core layers, such as commercially available tri-layer samples. The large value of maximum loss tangent of EVA is due to the high weight fraction of vinyl acetate in the copolymer and its amorphous structure (EVA having vinyl acetate content of less than 55 wt. % is considered to be a semi-crystalline polymer having much lower maximum loss tangent).

Example 2

Bilayer peel test samples were prepared to test the adhesion of EVA to PVB. Conventional PVB (Saflex® R series RB-41 PVB having about 18.7 wt. % residual hydroxyl content and 30 phr plasticizer, 30 mils thick) was used as a skin layer with a core layer of EVA. For the EVA layer, 100 parts EVA resin having a vinyl acetate content of 90 wt. %, with and without an adhesion modifier, were mixed and extruded to form sheets having a thickness of 30 mils. The adhesion modifier used was a PVAc-co-crotonic acid copolymer and was used in an amount of 10 wt. %.

After preparation of 7"×7" 30 mil sheets having different EVA cores, bilayer peel adhesion samples were made by laminating 6"×6" glass 2.3 mm thick (air side up), one PVB skin layer, a mylar insert, EVA core layer and a peel foil as the support layer. The laminates were de-aired at ambient temperature for 20 minutes using a vacuum bag. The vacuum bag was placed in a 130° C. oven until the laminate temperature reached 100° C. (about 20 min). After the autoclave cycle at 140° C., the laminates were ready for the peel test. The top layer adhered to the peel foil was cut into 4 cm strips for testing. The peel adhesion was measured in N/cm on an Instron 5943 peel tester.)

For the EVA sample without the adhesion modifier, the peel adhesion was very low at less than 2 N/cm, while for the EVA sample with the adhesion modifier, the peel adhesion was 32 N/cm.

Figure 6:
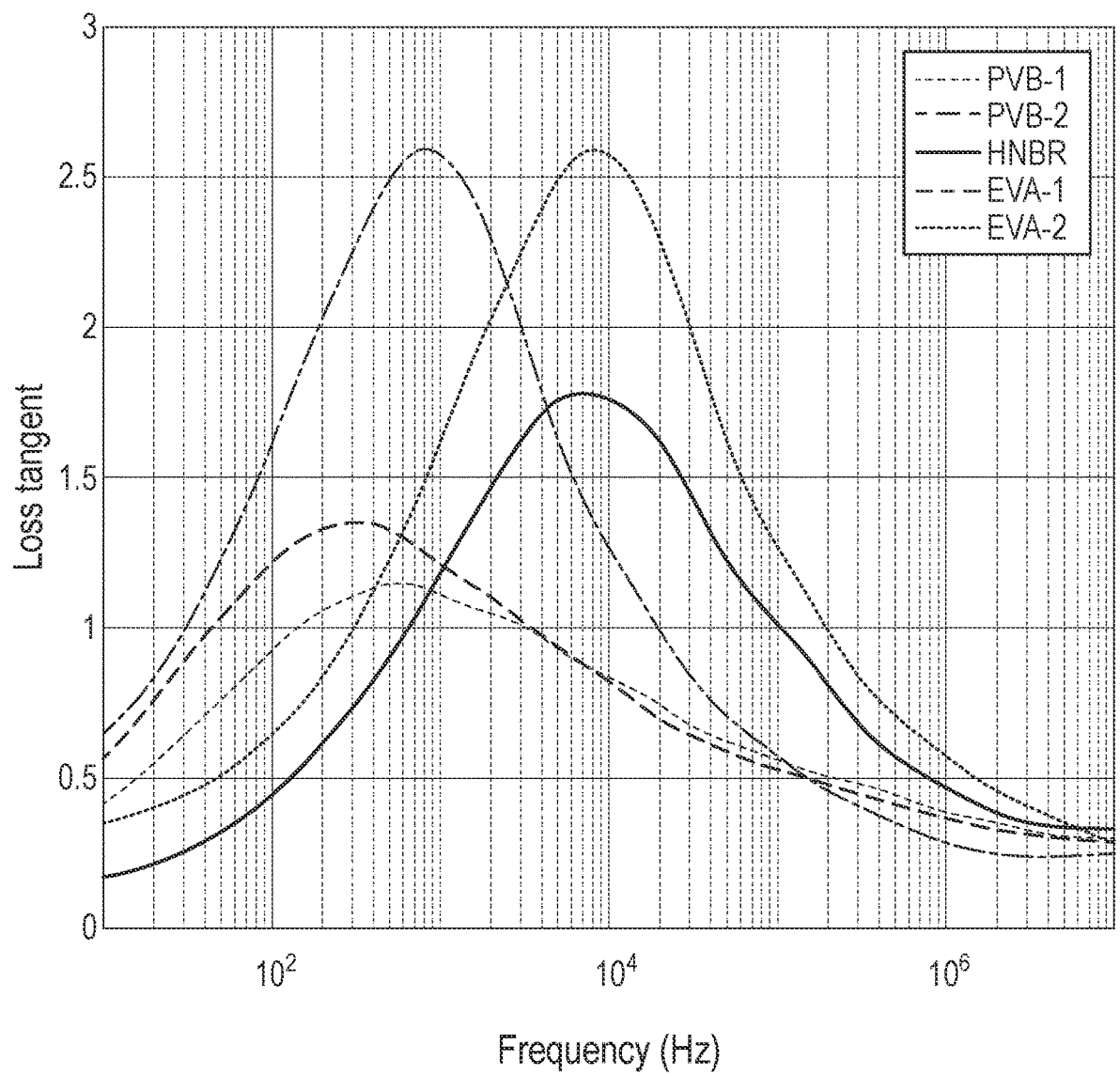
FIG. 6 is a graph showing the loss tangent of two EVA core layers compared to 2 different acoustic PVB interlayers and HNBR.

FIG. 6 is a set of master curves showing the loss tangent of two EVA core layers compared to 2 different acoustic PVB interlayers and Hydrogenated Nitrile Butadiene Rubber (HNBR). As shown in FIG. 6, there is a significant increase in maximum loss tangent value when using a core layer comprising EVA compared to the core layer comprising PVB. The EVA cores also have a higher maximum loss tangent than that of a rubber (HNBR).

Figure 7A:
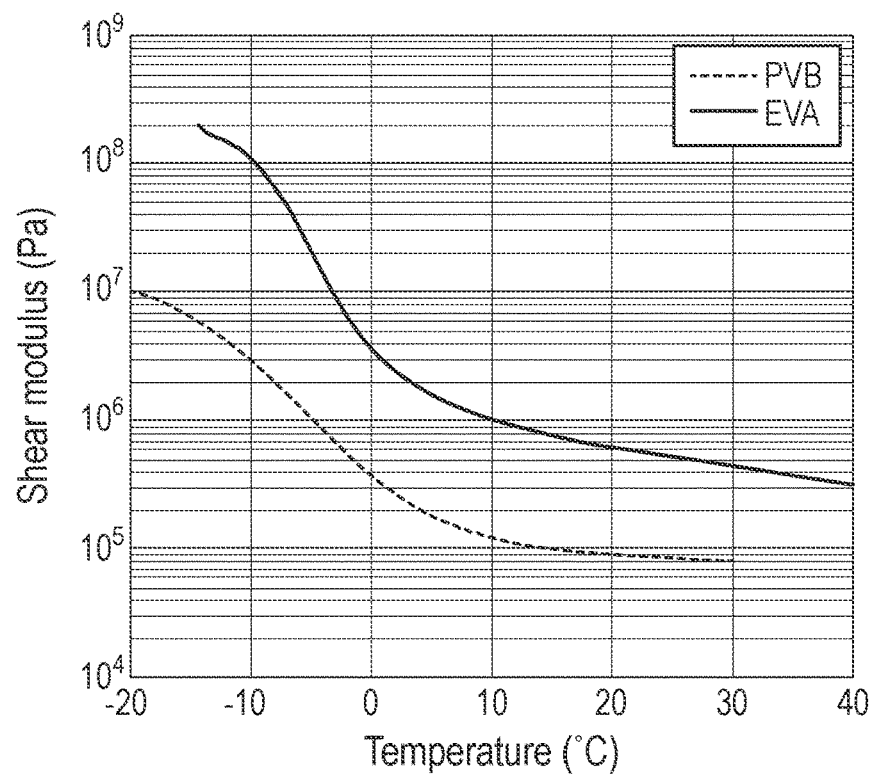
FIG. 7A is a graph showing the shear moduli as a function of temperature for PVB and EVA formulations targeted for acoustic applications.
Figure 7B:
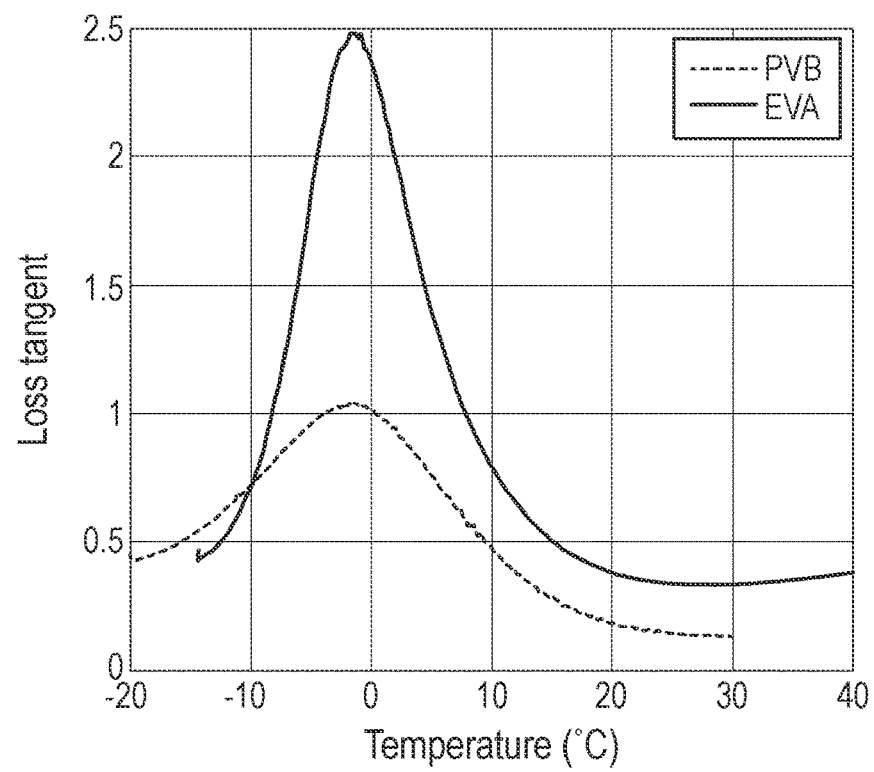
FIG. 7B is a graph showing loss tangent as a function of temperature for PVB and EVA formulations targeted for acoustic applications.

FIG. 7A is a graph showing the shear moduli as a function of temperature for PVB and EVA formulations targeted for acoustic applications, and FIG. 7B is a graph showing loss tangent as a function of temperature for PVB and EVA formulations targeted for acoustic applications. The mechanical properties of EVA that are most relevant to acoustic performance are shown in FIG. 7A and FIG. 7B. During the physical process of sound transmission, the modulus of the interlayer determines where the coincidence frequency band begins in a STL spectrum whereas the loss tangent dictates how far the exhibited STL goes down as the coincidence effect kicks in. It is clear from FIG. 7A and FIG. 7B that the magnitude of both properties in EVA significantly exceeds those of PVB. In other words, compared to pure PVB interlayers, EVA is able to provide a narrower band where the STL gets compromised by the coincidence effect, and when it does, the reduction in STL is smaller. Therefore, better acoustic performance can be achieved when using core layers having EVA.

In conclusion, the multilayered interlayers with layers comprising an ethylene vinyl acetate resin have advantages over conventional multilayered interlayers previously utilized in the art. In general, in comparison to multilayered interlayers previously utilized in the art, the multilayered interlayers comprising ethylene vinyl acetate resin as described herein have improved acoustic properties. Other advantages will be readily apparent to those skilled in the art.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, or characteristics given for any single component of the present disclosure can be used interchangeably with any ranges, values or characteristics given for any of the other components of the disclosure, where compatible, to form an embodiment having defined values for each of the components, as given herein throughout. For example, an interlayer can be formed comprising poly(vinyl butyral) having a residual hydroxyl content in any of the ranges given in addition to comprising a plasticizers in any of the ranges given to form many permutations that are within the scope of the present disclosure, but that would be cumbersome to list. Further, ranges provided for a genus or a category, such as phthalates or benzoates, can also be applied to species within the genus or members of the category, such as dioctyl terephthalate, unless otherwise noted.

What is claimed is:

1. A multilayer interlayer comprising:
   a first polymer layer;
   a second polymer layer;
   a third polymer layer comprising an ethylene vinyl acetate copolymer having a vinyl acetate content of at least 70 weight percent, wherein the third polymer layer is between and in contact with the first polymer layer and the second polymer layer, and wherein the first polymer layer comprises a poly(vinyl acetal) resin and at least one plasticizer and the second polymer layer comprises poly(vinyl acetal) resin.

2. The multilayer interlayer of claim 1, wherein the third polymer layer comprises no added plasticizer.

3. The multilayer interlayer of claim 1, wherein the third polymer layer comprises a plasticizer.

4. The multilayer interlayer of claim 1, wherein the third polymer layer has a glass transition temperature (Tg) of less than 0° C.

5. The multilayer interlayer of claim 1, wherein the third polymer layer comprises an adhesion modifier in an amount of at least 0.1 weight percent.

6. The multilayer interlayer of claim 1, wherein the first polymer layer comprises a poly(vinyl butyral) resin and at least one plasticizer.

7. The multilayer interlayer of claim 1, wherein the second polymer layer comprises a poly(vinyl butyral) resin and at least one plasticizer.

8. The multilayer interlayer of claim 1, wherein the multilayer interlayer has a sound transmission loss (STL) (as measured by ASTM E90 (2009) at 20° C. in a 2.3 mm/2.3 mm glass configuration) of at least about 40 decibels (dB) at 4000 Hertz (Hz) and damping loss factor of at least 0.2 (as measured by ISO16940 at 20° C. in a 2.3 mm/2.3 mm glass configuration).

9. The multilayer interlayer of claim 1, wherein the multilayer interlayer has a sound transmission loss (STL) (as measured by ASTM E90 (2009) at 20° C. in a 2.3 mm/2.3 mm glass configuration) of at least about 39 dB at 2000 Hz.

10. The multilayer interlayer of claim 1, wherein the multilayer interlayer has a sound transmission loss (STL) (as measured by ASTM E90 (2009) at 20° C. in a 2.3 mm/2.3 mm glass configuration) of at least about 47.5 dB at 6350 Hz.

11. A multiple layer glazing comprising:
   a first rigid substrate,
   the interlayer of claim 1, and
   a second rigid substrate.

* * * * *